United States Patent
Koskela et al.

(10) Patent No.: US 9,578,677 B2
(45) Date of Patent: Feb. 21, 2017

(54) METHOD AND APPARATUS FOR MANAGEMENT OF CELLULAR CONNECTIONS

(75) Inventors: Jarkko Koskela, Oulu (FI); Hannu Bergius, Kangasala (FI); Jorma Kaikkonen, Oulu (FI); Ari Laukkanen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 14/408,581

(22) PCT Filed: Jun. 19, 2012

(86) PCT No.: PCT/FI2012/050633
§ 371 (c)(1),
(2), (4) Date: Dec. 17, 2014

(87) PCT Pub. No.: WO2013/190170
PCT Pub. Date: Dec. 27, 2013

(65) Prior Publication Data
US 2015/0156813 A1    Jun. 4, 2015

(51) Int. Cl.
*H04W 72/00* (2009.01)
*H04W 76/06* (2009.01)
*H04W 60/00* (2009.01)
*H04W 76/02* (2009.01)
*H04W 24/04* (2009.01)

(52) U.S. Cl.
CPC ........... *H04W 76/068* (2013.01); *H04W 60/00* (2013.01); *H04W 76/027* (2013.01); *H04W 24/04* (2013.01)

(58) Field of Classification Search
CPC .... H04W 72/04; H04W 12/08; H04W 84/045; H04W 92/02; H04W 24/00; H04W 36/12; H04W 48/18; H04W 8/065; H04W 76/00–76/068; H04B 7/18558
USPC ........... 455/432.1–435.3, 450–458; 370/329, 370/330; 709/225, 226, 228, 229
See application file for complete search history.

(56) References Cited

U.S. PATENT DOCUMENTS

| | | | | |
|---|---|---|---|---|
| 5,884,175 A | * | 3/1999 | Schiefer | H04M 3/36 455/436 |
| 6,119,000 A | * | 9/2000 | Stephenson | H04M 3/36 455/432.1 |
| 6,314,290 B1 | * | 11/2001 | Joshi | H04B 7/18558 455/427 |
| 7,272,397 B2 | | 9/2007 | Gallagher et al. | |

(Continued)

FOREIGN PATENT DOCUMENTS

GB    2466452 A    6/2010

*Primary Examiner* — Allahyar Kasraian
(74) *Attorney, Agent, or Firm* — Seppo Laine Oy

(57) ABSTRACT

In accordance with an example embodiment of the present invention, there is provided an apparatus configured to receive a location update reject message and to determine whether a radio resource connection release message is issued in connection with the location update reject message. The apparatus is further configured to, responsive to a determination that a radio resource connection release message is issued in connection with the location update reject message, initiate an attach procedure using a new radio resource connection, and responsive to a determination that no radio resource connection release message is issued in connection with the location update reject message, to initiate an attach procedure using an existing radio resource connection.

16 Claims, 5 Drawing Sheets

(56) References Cited

U.S. PATENT DOCUMENTS

| | | | |
|---|---|---|---|
| 2002/0111169 A1* | 8/2002 | Vanghi | H04W 76/025 455/436 |
| 2008/0084272 A1* | 4/2008 | Modiano | G07B 15/063 340/5.2 |
| 2009/0170507 A1 | 7/2009 | Kim | |
| 2010/0003978 A1* | 1/2010 | Catovic | H04W 60/00 455/435.1 |
| 2010/0075658 A1* | 3/2010 | Hou | H04W 48/02 455/422.1 |
| 2010/0081434 A1 | 4/2010 | Ahluwalia | |
| 2010/0144316 A1* | 6/2010 | Piercy | H04W 12/06 455/411 |
| 2011/0039527 A1* | 2/2011 | Yi | H04W 48/18 455/418 |
| 2012/0076121 A1* | 3/2012 | Choi | H04W 76/062 370/338 |
| 2012/0189016 A1* | 7/2012 | Bakker | H04W 76/021 370/401 |
| 2013/0005335 A1* | 1/2013 | Cheng | H04W 60/00 455/434 |
| 2013/0070728 A1* | 3/2013 | Umatt | H04W 36/0022 370/331 |
| 2013/0130678 A1* | 5/2013 | Zanier | H04W 8/065 455/433 |

\* cited by examiner

METHOD AND APPARATUS FOR MANAGEMENT OF CELLULAR CONNECTIONS

TECHNICAL FIELD

The present application relates generally to cellular communications and management of cellular connections.

BACKGROUND

A cellular communications network typically comprises a plurality of individual cells. A cell is typically controlled by a base station, which may be connected to a backbone network by a wire-line connection. The backbone network may connect base stations to each other, to base station controllers or to core network nodes. Base stations communicate with mobile stations within cell coverage areas of their cells using a wireless radio interface. A base station may control more than one cell.

When a mobile terminal moves around in a coverage area of a cellular network, it may change attachment from one cell to another, a process known as a handover. Should the mobile terminal require services of the network, such as internet access or mobile telephony, it may be configured to contact the cell it is attached to. Should the mobile terminal on the other hand be an endpoint of an incoming communication, the network may be furnished with a database indicating which cell the mobile terminal is attached to, so that the incoming communication can be routed from the network side to the correct cell. The database may be updated each time the mobile terminal changes attachment from one cell to another.

In some networks, instead of recording in the database which cell each mobile terminal is attached to, the network may be sectioned into areas each comprising a plurality of cells. In these networks, the database may store for each mobile terminal an identity of such an area, such that the area comprises the cell the mobile terminal is attached to. Such areas may generally be referred to as location areas, wherein specific technologies may employ alternative terminology such as routing area or tracking area.

When a mobile terminal is an endpoint of an incoming communication, such as for example a phone call, the network may be configured to refer to the database to determine, which location area comprises the cell the mobile terminal is attached to. The network may then signal to each cell comprised in the location area, that there is an incoming communication to the mobile terminal.

SUMMARY

Various aspects of examples of the invention are set out in the claims.

According to a first aspect of the present invention, there is provided an apparatus, comprising a receiver configured to receive a location update reject message, at least one processing core configured to determine whether a radio resource connection release message is issued in connection with the location update reject message, and responsive to a determination that the radio resource connection release message is issued in connection with the location update reject message, the at least one processing core is configured to initiate an attach procedure using a new radio resource connection, and responsive to a determination that no radio resource connection release message is issued in connection with the location update reject message, the at least one processing core is configured to initiate an attach procedure using an existing radio resource connection.

According to a second aspect of the present invention, there is provided a method, comprising receiving a location update reject message, determining whether a radio resource connection release message is issued in connection with the location update reject message, and responsive to a determination that the radio resource connection release message is issued in connection with the location update reject message, initiating an attach procedure using a new radio resource connection, and responsive to a determination that no radio resource connection release message is issued in connection with the location update reject message, initiating an attach procedure using an existing radio resource connection.

According to a third aspect of the present invention, there is provided an apparatus, comprising means for receiving a location update reject message, means for determining whether a radio resource connection release message is issued in connection with the location update reject message, and means for, responsive to a determination that the radio resource connection release message is issued in connection with the location update reject message, initiating an attach procedure using a new radio resource connection, and responsive to a determination that no radio resource connection release message is issued in connection with the location update reject message, initiating an attach procedure using an existing radio resource connection.

According to a fourth aspect of the present invention, there is provided a computer program product comprising a non-transitory computer-readable medium bearing computer program code embodied therein for use with a computer, the computer program code comprising code for receiving a location update reject message, code for determining whether a radio resource connection release message is issued in connection with the location update reject message and code for, responsive to a determination that the radio resource connection release message is issued in connection with the location update reject message, initiating an attach procedure using a new radio resource connection, and responsive to a determination that no radio resource connection release message is issued in connection with the location update reject message, initiating an attach procedure using an existing radio resource connection.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
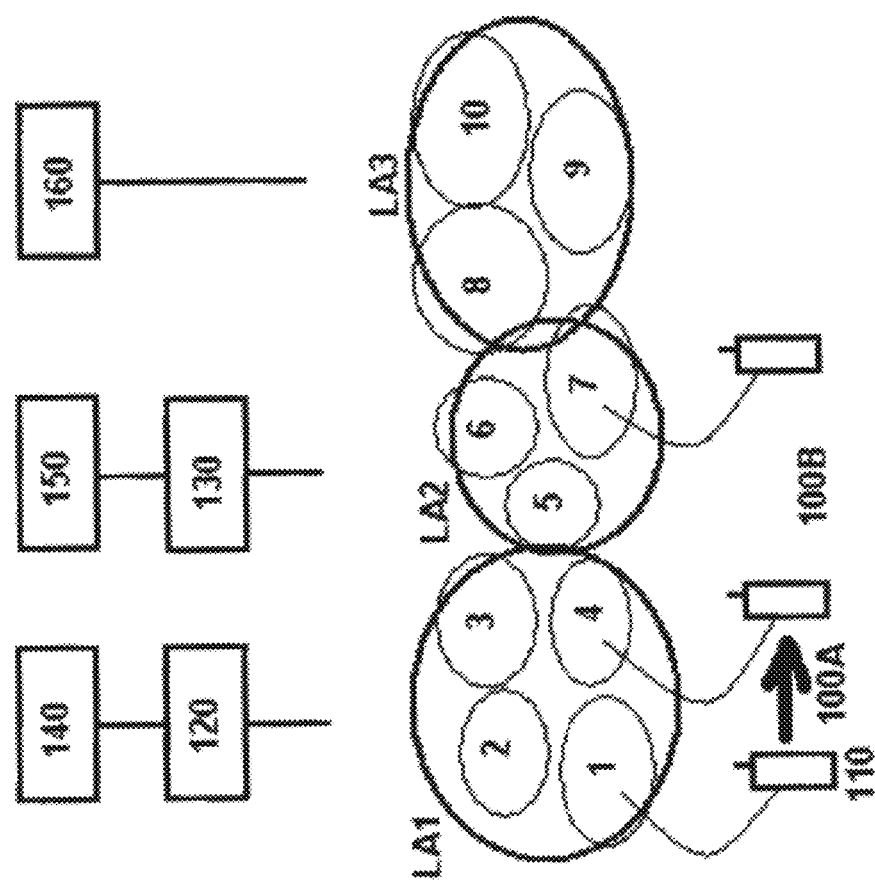
FIG. 1 illustrates an example system capable of supporting at least some embodiments of the invention.

FIG. 1 illustrates an example system capable of supporting at least some embodiments of the present invention. In FIG. 1 is illustrated mobile 110, which may comprise, for example, a cellular telephone, a tablet computer, a personal digital assistant, PDA, a laptop computer, a wireless data module, an automated wireless sensor or another kind of electronic device with a cellular connectivity capability. Also illustrated are cells labeled with reference numerals 1, 2, 3, 4, 5, 6, 7, 8, 9 and 10. Each cell is controlled by a base station, wherein each base station may control one or more cells. The cells are grouped into location areas LA1, LA2 and LA3 such that location area LA1 comprises cells 1, 2, 3 and 4, location area LA2 comprises cells 5, 6 and 7, and finally location area LA3 comprises cells 8, 9 and 10. The cells may operate in accordance with a cellular technology, such as for example wideband code division multiple access, WCDMA, long term evolution, LTE, or another cellular technology. In some embodiments of the invention, a first location area may comprise cells operating in accordance with a first radio access technology and a second location area may comprise cells operating in accordance with a second radio access technology.

At least some of base stations controlling cells 1, 2, 3, 4, 5, 6, 7, 8, 9 and 10 may be operably connected to each other using inter-base station interfaces, for example where location area LA3 comprises cells operating using the LTE technology, base stations controlling cells 8 and 9 may be connected to each other over a connection known as an X2 interface. Base stations controlling the cells may be connected to radio network controlling nodes, for example in global system for mobile communications, GSM, radio access technology, a base station controller, BSC, node controls a plurality of base stations that in turn control individual cells. In the WCDMA radio access technology, a radio network controlling node is known as a radio network controller, RNC. In some radio access technologies, such as for example LTE, there is no separate radio network controlling node and base stations, known in LTE as eNBs, are connected directly to a cellular core network node.

As a schematic reference, FIG. 1 illustrates location area LA1 as comprising cells operating in accordance with the GSM radio access technology, such that base stations controlling cells 1, 2, 3 and 4 are operably connected to BSC 120, which in turn is operably connected to a core network node, such as for example a mobile switching centre MSC 140. Likewise FIG. 1 illustrates location area LA2 as comprising cells operating in accordance with the WCDMA radio access technology, such that base stations controlling cells 5, 6 and 7 are operably connected to RNC 130, which in turn is operably connected to a core network node, which may be a mobile switching centre MSC or a serving general packet radio service support node, SGSN, 150. A location area may be known as a routing area in terminology of the WCDMA radio access technology. Likewise FIG. 1 illustrates location area LA3 as comprising cells operating in accordance with the LTE radio access technology, such that base stations controlling cells 8, 9 and 10 are operably connected to mobility management entity, MME, 160, which is comprised in the core network. A location area may be known as a tracking area in terminology of the LTE radio access technology.

FIG. 1 further illustrates two handovers, 100A and 100B. In handover 100A, mobile 110 is handed over from cell 1 to cell 4, which are both comprised in location area LA1. Since cell 1 and cell 4 are both comprised in the same location area, there is no need to update a database storing an association between an identity of mobile 110, or an identity of a subscription associated with mobile 110, and the location area where mobile 110 is reachable. The association may be referred to as a registration, thus when the database stores an association between mobile 110, or a corresponding subscription identity, and location area LA1, it may be said that mobile 110 is registered in location area LA1. Handover 100A may be referred to as an intra-location area handover. Handover 100B involves a change in attachment of mobile 110 from cell 4 to cell 7. Since cell 4 is comprised in location area LA1 and cell 7 is comprised in location area LA2, handover 100B may be referred to as an inter-location area handover. Updating of the database becomes necessary since mobile 110 is, after handover 100B, reachable in location area LA2, and no longer location area LA1. In some embodiments, a mobile may be registered simultaneously in a plurality of location areas. In these embodiments, updating the association becomes necessary when the mobile changes attachment to a cell that is comprised in a location area that isn't comprised in the plurality of location areas in which the mobile is registered.

When mobile 110 determines that it has handed over to a location area where mobile 110 isn't registered, mobile 110 may be configured to initiate, by sending a signal, a location area updating procedure toward the network to cause the association in the database to be updated with the new location area. A signal from mobile 110 initiating a location area update procedure is known in the GSM radio access technology, RAT, as a location area update request. In the WCDMA RAT the signal is known as a routing area update request. In the LTE RAT the signal is known as a tracking area update request.

Following handover, mobile 110 may have an active context toward the network. This context may be known as a UE context. A context may be active between mobile 110 and a serving gateway, SGW, in an LTE core network, for example. A context may comprise at least one of parameters of internet protocol, IP, level bearers, network internal routing information and other information. In handover, the context may be transferred from the source base station to the target base station to enable seamless connectivity for mobile 110.

Mobile 110 may have a radio resource control, RRC, connection with a base station. When mobile 110 has a RRC connection, it may be considered to be in a RRC connected mode and capable of transferring information with the network. When mobile 110 is not in RRC connected mode, it may be in a RRC idle mode, for example. For example, when a user of mobile 110 triggers an application such as a web browser in mobile 110, mobile 110 may initiate a state transition from RRC idle to the RRC connected mode, to allow for the application to receive information from the network for presentation to the user.

In some cases, a location area update process, such as for example a location area update process, a routing area update process or a tracking area update process, cannot be completed successfully. For example, where mobile 110 transmits a signal initiating a location area update process, the signal comprising an identity of mobile 110 that the network doesn't recognize, the association between identity and location area cannot be updated in the database. Likewise where the network has implicitly detached mobile 110 from the network, there may be no current registration of mobile 110 in the database and thus an error condition may be generated. Mobile 110 may become implicitly detached from the network when mobile 110 fails to perform a location area update procedure at a configured interval, for example. This may occur where mobile 110 has exhausted its battery, for example, or has been out of communication with the network for a time period that exceeds the configured interval. A third example is a case where the network has no evolved packet system, EPS, bearer context for mobile 110, which may cause a location area update request from mobile 110 to be rejected.

When a location area update procedure fails, the network may be configured to return, responsive to a location area update request message from mobile 110, a location area update reject message to mobile 110. In an LTE system, for example, the location area update reject message takes the form of a tracking area update reject.

Figure 3:
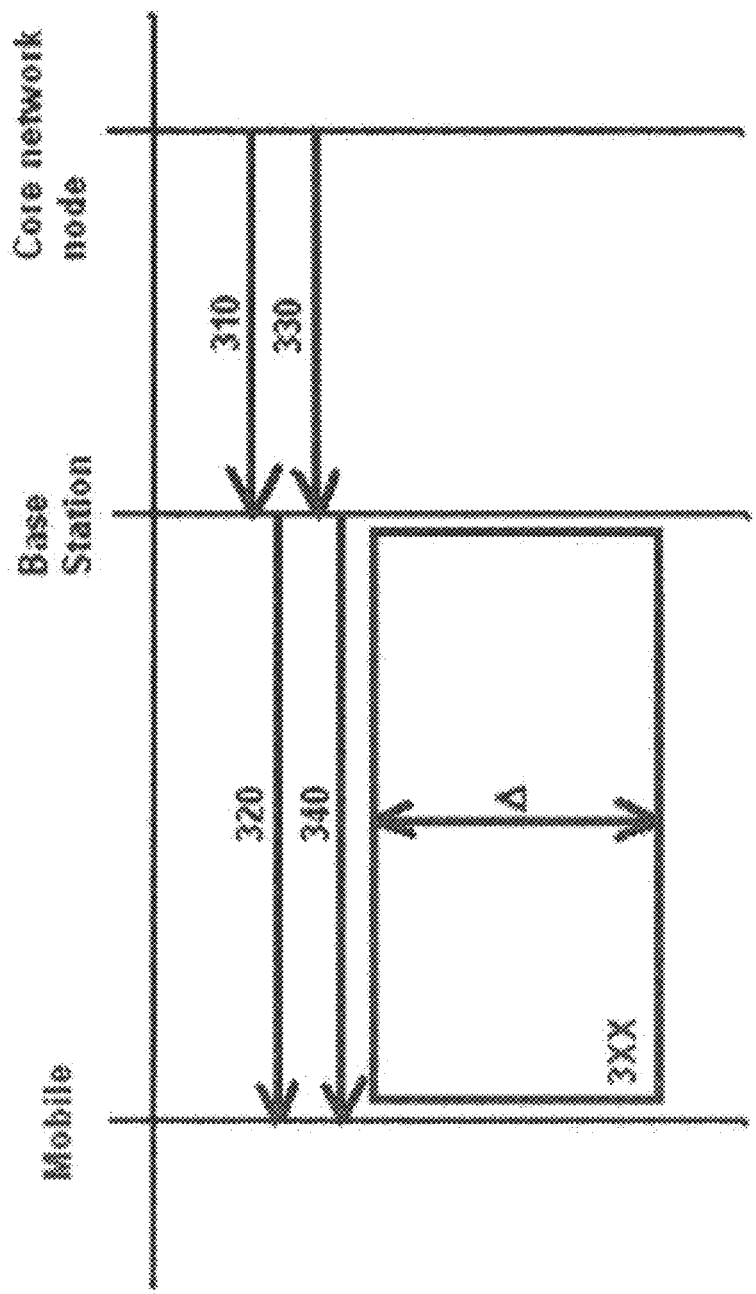
FIG. 3 illustrates a first problem in some implementations.

Two problems may arise in interactions between mobile 110 and a network in connection with rejected location area updating procedures. The first problem is illustrated in FIG. 3. A network rejecting a location area updating procedure may, in a location area update reject message, explicitly or implicitly request mobile 110 to re-attach to the network. Re-attaching to the network may comprise sending a new attachment request to the network. FIG. 3 illustrates at the top mobile, such as for example mobile 110, a base station controlling a cell into which the mobile has handed over into, and a core network node operably connected to the base station. At the start of the signaling illustrated in FIG. 3, the mobile may have just recently handed over into a cell controlled by the base station, and responsive to the handover the mobile may have transmitted a location area update request message. In phase 310, the core network node instructs the base station that the location area update request previously sent by the mobile is to be rejected. Responsively, the base station may be configured to inform the mobile of the rejection of the location area update process, which is illustrated as phase 320. The message of phase 320 may request the mobile, implicitly or explicitly to re-attach to the network. The mobile of FIG. 3 may be configured to always perform a re-attach requested in a location area update reject message with an existing RRC connection. In phase 330, the core network node may transmit to the base station a context release instruction, for example a UE context release instruction message. Responsive to the message of phase 330, the base station may be configured to transmit to the mobile a RRC connection release instruction message.

In some implementations, responsive to receiving a RRC connection release instruction message, the mobile is configured to begin release of an existing RRC connection, which may take an amount of time indicated in FIG. 3 with Δ, during a teardown procedure indicated as 3XX. As teardown of an RRC connection is ongoing, the mobile may wind up in an error condition if it attempts to comply with message 320 by initiating attach over the RRC connection while teardown of the RRC connection is ongoing, that is if the mobile is in state 3XX. Recovery from the error condition may take as long as ten seconds, resulting in a significant degradation of perceived connection quality for a user of the mobile. The mobile could recover connectivity much sooner by waiting until time interval 4 has elapsed, the old RRC connection has been torn down, and then initiating re-attachment with a new RRC connection.

Figure 4:
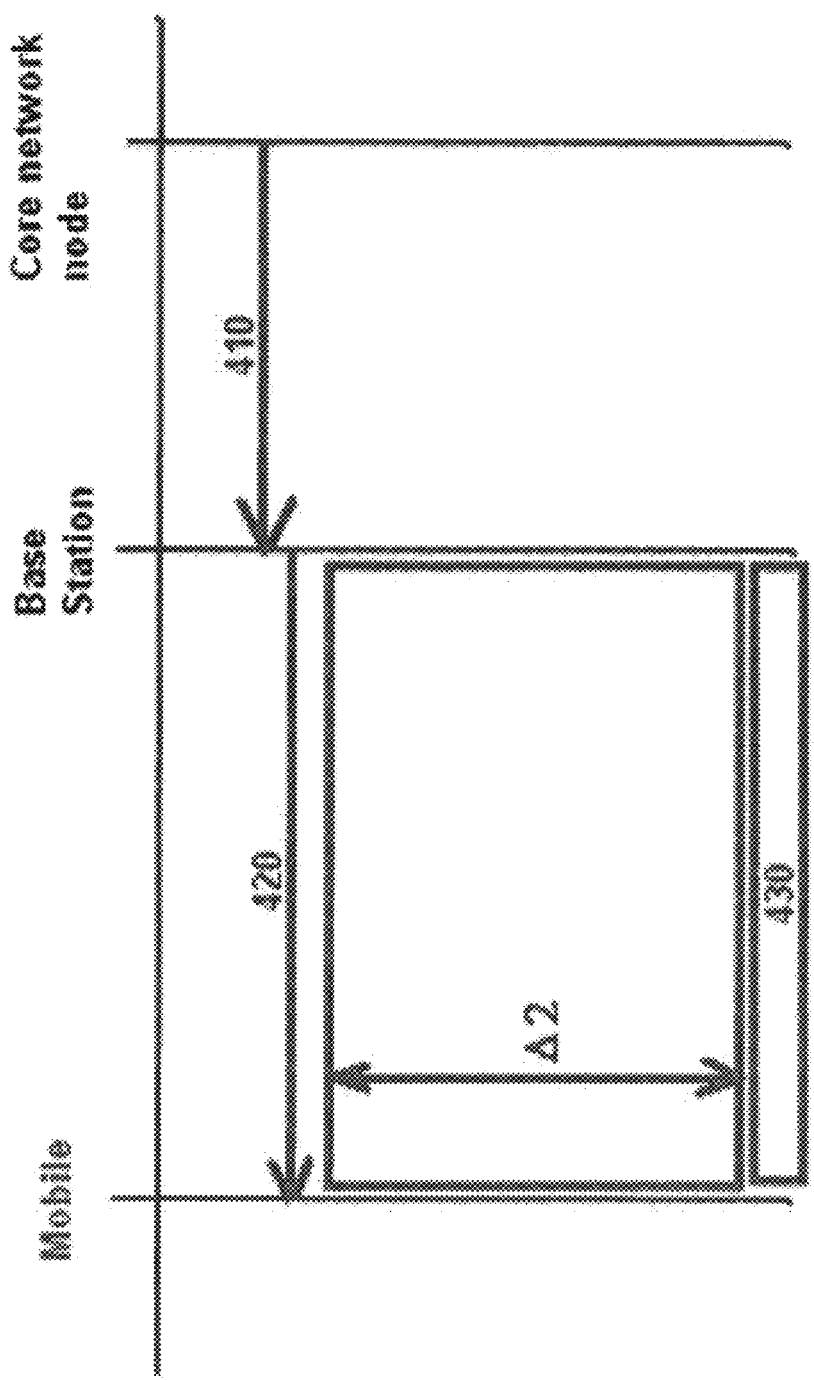
FIG. 4 illustrates a second problem in some implementations.

A second problem is illustrated in FIG. 4. FIG. 4 illustrates the mobile, base station and core network node like FIG. 3, and like FIG. 3, the mobile has just requested a location area update procedure, possibly responsive to handing over into a cell controlled by the base station. In phase 410, the core network node informs the base station that the requested location area update procedure is rejected. Responsively, the base station informs the mobile that the location update procedure has been rejected by the network, phase 420. The message of phase 420 may request re-attachment to the network. The mobile of FIG. 4 may be configured to always perform a re-attach requested in a location area update reject message with a new RRC connection. Responsive to the message of phase 420, the mobile may be configured to re-attach using a new RRC connection. In case the mobile however has an existing RRC connection, it may need to wait until the existing connection expires due to inactivity, the inactivity period being illustrated by period 42. This may be so, for example, where the radio access technology used does not comprise procedures enabling a mobile to request teardown of an existing RRC connection. In practical implementations, Δ2 may be of the order of 10 seconds. Following expiry of the inactivity time of the existing RRC connection, the existing RRC connection is caused to be torn down, phase 430, subsequent to which the mobile may re-attach using a new connection. As can be seen, similarly to the first problem, a delay of around ten seconds may be incurred.

A mobile 110 operating in accordance with at least some embodiments of the invention may be configured to avoid both aforementioned problems by determining, if the network will issue a radio resource connection release message, such as for example the message of phase 340. To this end, responsive to receiving the location area update reject message of phases 320 or 420, the mobile may determine whether the a radio resource connection release message, such as for example the message of phase 340, will be issued by the network. In detail, where a radio resource connection release message is issued, the mobile may be configured to responsively tear down an existing radio resource connection, wait until the teardown is complete, and then initiate re-attachment using a new radio resource connection, such as for example a RRC connection. Where the radio resource connection release message is not issued, the mobile may be configured to responsively use an already existing radio resource connection to initiate re-attachment. Acting in this way, the mobile will be able to avoid both the delay caused by the first problem, and the delay caused by the second problem. In other words, instead of always using either a new radio resource connection or an existing radio resource connection, a mobile may be configured to decide based on the determination, whether to use a new or existing radio resource connection to avoid both problems described above. A RRC connection is an example of a radio resource connection in accordance with the LTE and WCDMA radio access technologies. A failed location area update procedure may occur, for example, where a mobile changes attachment from a second- or third-generation radio access technology, such as GSM or WCDMA, to a fourth-generation radio access technology, such as LTE.

In general there is provided an apparatus, such as for example a mobile terminal or a control device for inclusion in a mobile terminal, to control the functioning of the mobile terminal. Examples of such control devices include a processor and a chipset. The apparatus may comprise a receiver configured to receive a location update reject message, such as for example a location area update reject message. Where the apparatus is a mobile terminal, the receiver may be a radio receiver comprised in the mobile terminal. Where the apparatus is a control device, the receiver may be an input device comprised in the control device, such as for example a serial port pin and associated serial port, or a parallel port, to enable the control device to receive information from, for example, a radio receiver comprised in a mobile terminal. The information may be conveyable from the radio receiver to the input device of the control device via electrical leads internal to a mobile terminal, for example.

The apparatus may further comprise at least one processing core configured to determine whether a radio resource connection release message is issued in connection with the location update reject message. Responsive to determination that a radio resource connection release message is issued in connection with the location update reject message, the at least one processing core may be configured to initiate an attach procedure using a new radio resource connection. Responsive to a determination that no radio resource connection release message is issued in connection with the location update reject message, the at least one processing core may be configured to initiate an attach procedure using an existing radio resource connection.

Initiating an attach procedure using an existing radio resource connection, such as for example a RRC connection, may comprise causing an attach request message to be transmitted to a base station on the existing radio resource connection. Initiating an attach procedure using a new radio resource connection, such as for example a RRC connection, may comprise causing a new radio resource connection request to be transmitted to a base station after an existing radio resource connection is torn down, and subsequent to the new radio resource connection being established, causing an attach request message to be transmitted to a base station on the new radio resource connection. Where no existing radio resource connection exists, initiating an attach procedure using a new radio resource connection may comprise causing a new radio resource connection request to be transmitted to a base station without tearing down an existing radio resource connection.

In some embodiments, determining whether a radio resource connection release message is issued in connection with the location update reject message comprises the at least one processing core causing the apparatus to wait, following receipt of the location update reject message, for a preconfigured time period, for the radio resource connection release message to be received by the receiver. The waiting may be controlled by a timer set to the preconfigured time period, the timer being triggered by the receipt of the location update reject message. In these embodiments, waiting ends responsive to the timer expiring after the preconfigured time has elapsed since receipt of the location update reject message.

In some embodiments, determining whether a radio resource connection release message is issued in connection with the location update reject message comprises checking whether the location update reject message comprises a radio resource connection release message.

In some embodiments, the location update reject message is a location area update reject message, such as for example a tracking area update reject message or a routing area update reject message. A tracking area update reject message may be issued by an LTE base station, which is known as an eNB.

In some embodiments, a tracking area update reject message comprises an implicit or explicit request for the apparatus to re-attach to the network transmitting the tracking area update reject message. A tracking area update reject message may comprise an indication as to a cause why the tracking area update procedure is rejected. The indication as to cause may comprise an indication as to at least one of the following causes: a user equipment identity cannot be determined by the network, a mobile has become implicitly detached and no EPS bearer context activated.

In some embodiments, the apparatus is configured to select the length of the preconfigured time period based at least in part on a signaling message from the network. In some embodiments, the length of the preconfigured time period is selected in the apparatus in dependence of the radio access technology the location update reject message is in accordance with. The apparatus may receive from the network separate preconfigured time period lengths for a plurality of different radio access technologies, or different versions of the same radio access technology.

In some embodiments, the preconfigured time period is 100 to 300 milliseconds long. In other embodiments, the preconfigured time period is 50 to 60 milliseconds long.

Figure 5:
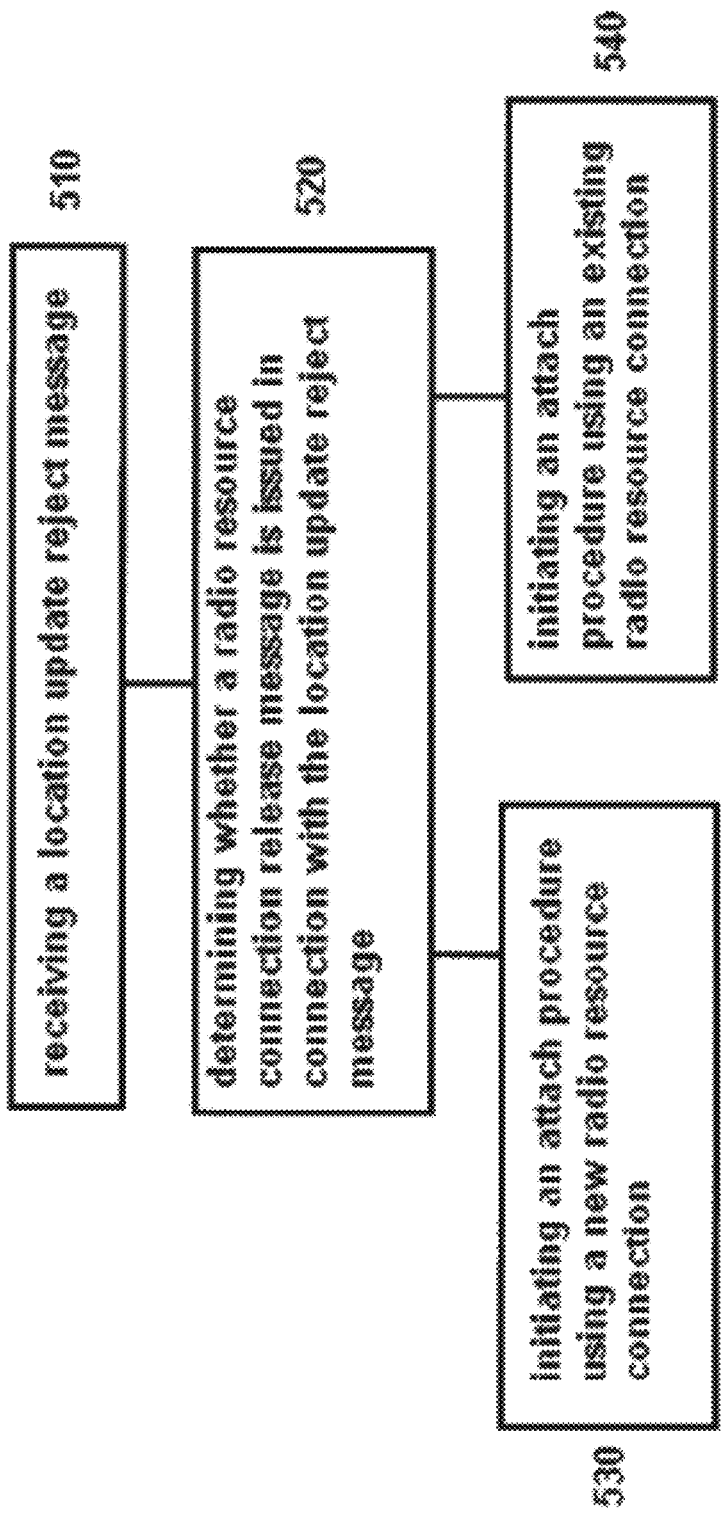
FIG. 5 is a flowgraph illustrating a method in accordance with at least some embodiments of the invention.

FIG. 5 is a flowgraph illustrating a method in accordance with at least some embodiments of the invention. In phase 510, a location update reject message is received. The location update reject message may comprise, for example, a routing area update reject message or a tracking area update reject message in accordance with WCDMA or LTE radio access technologies.

In phase 520, it is determined whether a radio resource connection release message, such as for example a RRC connection release message, is issued in connection with the location update reject message. Responsive to a determination that a radio resource connection release message is issued in connection with the location update reject message, processing advances to phase 530 where an attach procedure is initiated, or caused to be initiated, using a new radio resource connection. Responsive to a determination that no radio resource connection release message is issued in connection with the location update reject message, processing advances from phase 520 to phase 530, where an attach procedure is initiated, or caused to be initiated, using an existing radio resource connection.

Figure 2:
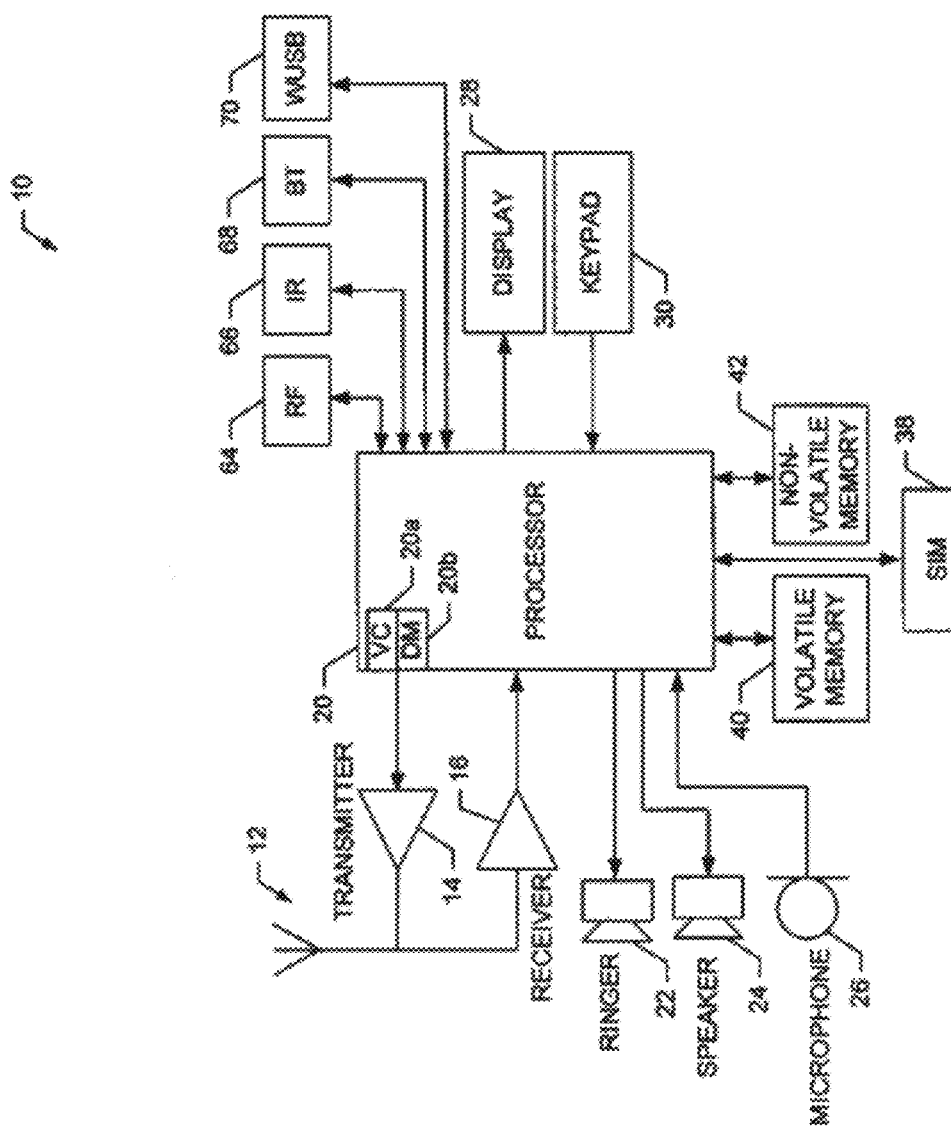
FIG. 2 illustrates an example apparatus capable of supporting at least some embodiments of the invention.

FIG. 2 illustrates a block diagram of an apparatus 10 such as, for example, a mobile terminal, in accordance with at least some embodiments of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40 non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that delays are avoided in error situations in connection with location area update rejection situations.

Embodiments of the present invention may be implemented in software, hardware, application logic or a combination of software, hardware and application logic. The software, application logic and/or hardware may reside on memory 40 and/or 42 of FIG. 2, the processor 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   a receiver configured to receive a location update reject message;
   at least one processing core configured to determine whether a radio resource connection release message is issued in connection with the location update reject message, and
   responsive to a determination that the radio resource connection release message is issued in connection with the location update reject message, the at least one processing core is configured to initiate an attach procedure using a new radio resource connection, and responsive to a determination that no radio resource connection release message is issued in connection with the location update reject message, the at least one processing core is configured to initiate an attach procedure using an existing radio resource connection.

2. An apparatus according to claim 1, wherein the at least one processing core is configured to determine whether a radio resource connection release message is issued in connection with the location update reject message by waiting, following receipt of the location update reject message, for a preconfigured time period, for the radio resource connection release message.

3. An apparatus according to claim 2, wherein the apparatus is configured to at least one of receive information defining a length of the preconfigured time period from a network node and select the length of the preconfigured time period in dependence of a radio access technology the location update reject message is in accordance with.

4. An apparatus according to claim 2, wherein the preconfigured time period is 100 to 300 milliseconds long.

5. An apparatus according to claim 1, wherein the location update reject message comprises a tracking area update reject message according to long term evolution technology.

6. An apparatus according to claim 5, wherein the tracking area update reject message requests a new attach procedure.

7. An apparatus according to claim 5, wherein the tracking area update reject message comprises at least one of the following cause indications: user equipment identity cannot be determined by the network, implicitly detached and no EPS bearer context activated.

8. An apparatus according to claim 1, wherein the apparatus comprises a mobile communication device, the apparatus further comprising an antenna coupled to the receiver and configured to provide signals to the at least one processing core.

9. A method, comprising:
   receiving a location update reject message;
   determining whether a radio resource connection release message is issued in connection with the location update reject message, and
   responsive to a determination that the radio resource connection release message is issued in connection with the location update reject message, initiating an attach procedure using a new radio resource connection, and responsive to a determination that no radio resource connection release message is issued in connection with the location update reject message, initiating an attach procedure using an existing radio resource connection.

10. A method according to claim 9, wherein the determining comprises waiting, following receipt of the location update reject message, for a preconfigured time period, for the radio resource connection release message.

11. A method according to claim 10, further comprising at least one of receiving information defining a length of the preconfigured time period from a network node and selecting the length of the preconfigured time period in dependence of a radio access technology the location update reject message is in accordance with.

12. A method according to claim 10, wherein the preconfigured time period is 100 to 300 milliseconds long.

13. A method according to claim 9, wherein the location update reject message comprises a tracking area update reject message according to long term evolution technology.

14. A method according to claim 13, wherein the tracking area update reject message requests a new attach procedure.

15. A method according to claim 13, wherein the tracking area update reject message comprises at least one of the following cause indications: user equipment identity cannot be determined by the network, implicitly detached and no EPS bearer context activated.

16. A computer program product comprising a non-transitory computer-readable medium bearing computer program code embodied therein for use with a computer, the computer program code comprising:
   code for receiving a location update reject message;
   code for determining whether a radio resource connection release message is issued in connection with the location update reject message; and
   code for, responsive to a determination that the radio resource connection release message is issued in connection with the location update reject message, initiating an attach procedure using a new radio resource connection, and responsive to a determination that no radio resource connection release message is issued in connection with the location update reject message, initiating an attach procedure using an existing radio resource connection.

* * * * *